United States Patent [19]

Gabriel

[11] 4,159,592
[45] Jul. 3, 1979

[54] CLOSE COUPLING STRUT FOR CONSTRUCTION SET HAVING CLIP FASTENERS

[75] Inventor: Richard J. Gabriel, Beaverton, Oreg.

[73] Assignee: Matrix Toys, Inc., Portland, Oreg.

[21] Appl. No.: 868,274

[22] Filed: Jan. 10, 1978

[51] Int. Cl.² ............................................. A63H 33/10
[52] U.S. Cl. ......................................... 46/26; 46/29; 24/73 P; 85/80
[58] Field of Search .................... 46/16, 25, 26, 29; 24/73 P; 85/80

[56] References Cited

U.S. PATENT DOCUMENTS

| | | | |
|---|---|---|---|
| 3,089,269 | 5/1963 | McKiernan | 46/16 |
| 3,419,970 | 1/1970 | Wanderman | 46/23 |
| 3,566,530 | 3/1971 | Fischer | 46/23 |

*Primary Examiner*—Louis G. Mancene
*Assistant Examiner*—Robert F. Cutting
*Attorney, Agent, or Firm*—Chernoff & Vilhauer

[57] ABSTRACT

A close coupling strut for interconnecting multi-faceted joint elements is comprised of paired oppositely-facing, in line, elastically compressible clips which are separated and joined together by an intermediate bridge. The bridge is configured to separate the clips, which snap fit into mating joint openings located in the facets of the joint elements, and to release the clips for removal from the joint openings upon application of squeezing pressure thereon. Extension means are attached to each side of the bridge and extend outwardly thereof beyond the joined facets of the joint elements to facilitate squeezing of the bridge means when the user's fingers cannot be inserted between the closely spaced joint elements. Each clip has a V-shaped tip with ends that are separated by an overall transverse dimension which is greater than the height of the opening in the joint elements, and the bridge means has an overall transverse height approximately equal to the height of the joint openings. Therefore, as a clip is forced into a joint opening, it is deflected inwardly until it is inserted past the end of the tip where it again expands to its relaxed position thereby becoming locked into the joint opening. The clip is elongate in cross section to non-rotatably fit within the majority of the joint openings, which are similarly shaped, and to rotatably fit within those joint openings which are circular, thereby serving as an axle to allow rotation of one joint element with respect to another.

6 Claims, 8 Drawing Figures

CLOSE COUPLING STRUT FOR CONSTRUCTION SET HAVING CLIP FASTENERS

BACKGROUND OF THE INVENTION

This invention relates to a strut for use in snap-together construction sets, and particularly to such a strut which allows close coupling of the joint elements of the construction set.

A construction set having multi-faceted joint elements with openings in each facet, configured to receive snap fitting clip fastners located on each end of the elongate struts for joining a plurality of the struts into a structure is shown in U.S. Patent Application, Ser. No 483,580, filed Oct. 19, 1977. While construction sets of this type are a great improvement over prior art sets and allow construction of many structural shapes heretofore not possible, they do have a shortcoming which forecloses their use in certain applications. In particular, it is not possible to provide a short strut to join adjacent joint elements in close proximity to one another since the clips on the strut have to be squeezed in order to release them from the joint elements, and close spacing of the facets of the respective joint elements does not allow insertion of the user's finger between them to squeeze the clips.

Also, if the strut element is to be used as an axle, in addition to necessarily having to be quite short in order to reduce its moment arm, it must have means allowing it to be rotatably joined to the joint elements. This combination of features is not provided with the prior art devices of this class.

SUMMARY OF THE INVENTION

The strut of the present invention is used to interconnect hollow joint elements of the type having multiple angularly displaced planar facets which contain elongate joint openings therein. The strut comprises a pair of clips which extend outwardly from one another in opposite directions along a common axis. The clip includes a V-shaped tip having a width whichi is slightly less than the width of the joint openings and an overall transverse dimension at its base which is slightly greater than the height of the joint openings. Located inwardly adjacent to the ends of the base are bridge sections which interconnect the respective base ends of the tips of opposed clips, thereby forming the strut into an integral unit. The overall transverse dimension between the bridge sections is approximately equal to the height of the joint openings, thereby forming a step between the tips and the bridge sections. Accordingly, as a tip of a clip is forced into a joint opening the clip is deflected inwardly until the ends of the tip are fully inserted into the opening whereupon the clip is relaxed to lock it in place in the opening. In the embodiment illustrated the length of the bridge sections is quite short and they are separated by transverse extension sections which are configured so that the portion of the bridge section remaining on each side of the extension is slightly larger than the thickness of the joint element side walls. The extension sections extend outwardly of the bridge section past the periphery of the facets into which the clips are installed so that the bridge sections can be squeezed together to release the clips from the openings in the joint elements by application of squeezing pressure on the extension sections.

The bridge sections have arcuate top surfaces so that when they are installed into circular joint openings which are located at each end of the joint element, the strut can be rotated with respect to the joint element.

Accordingly, it is a principal objective of the present invention to provide a strut of the class described which allows very close coupling of adjacent joint elements.

It is a further object of the present invention to provide such a strut having clips which rotatably engage with those joint openings which are circular.

The foregoing objectives, features and advantages of the present invention will be more readily understood upon consideration of the following detailed description of the invention taken in conjunction with the accompanying drawings.

DETAILED DESCRIPTION OF THE INVENTION

Figure 1:
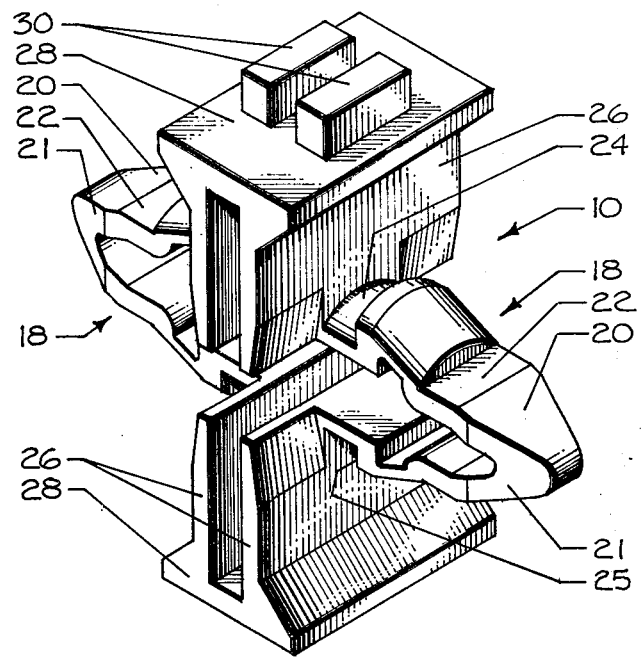
FIG. 1 is a perspective view showing a preferred embodiment of the clip of the present invention.
Figure 2:
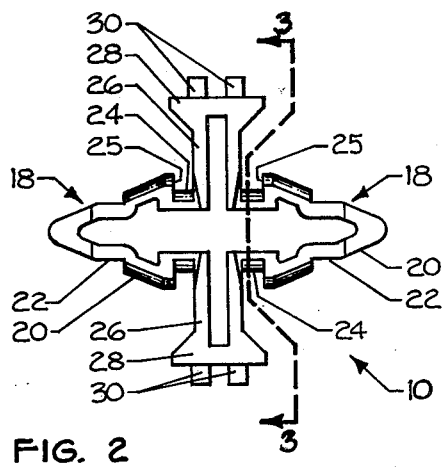
FIG. 2 is a side elevational view of the clip of FIG. 1.
Figure 3:
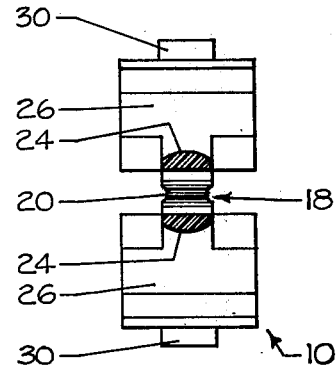
FIG. 3 is a sectional view taken on the line 3—3 in FIG. 2.

Referring to the drawings, the strut 10 of the present invention is used to interconnect hollow joint elements 12 of the type having multiple angularly displaced planar facets 14, each containing a medial joint opening 16. The joint elements preferably have 26 facets which are arranged in a generally spherical pattern. The joint openings located in the facets preferably are elongate to give maximum strength in a limited facet area.

Figure 4:
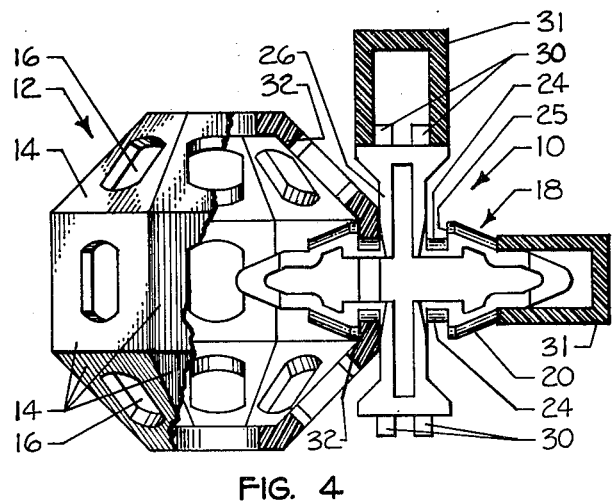
FIG. 4 is a side elevational view, partially broken away. showing the clip installed in a joint element.

The strut, best shown in FIG. 1, comprises a pair of clips 18 which extend outwardly from one another in opposite directions along a common axis. The clip is a thin, easily deformable plastic element and includes a V-shaped tip 20 having a width which is slightly less than the width of joint opening 16, except for its extremity 21 which taper inwardly. Located in the tip intermediate its ends, is a short, flat indentation 22. As is best shown in FIG. 4, the indentation allows the clip to be installed into a snap fit interlocking building blocks 31, such as "Lego" blocks. In the embodiment illustrated the top and bottom of the tip from indentation 22 outwardly are planar, and from the indentation inwardly they are acuate. The base ends of the tip have an overall transverse dimension which is slightly greater than the height at the joint openings.

Located inwardly adjacent to each base end of the tip is a bridge section 24 which interconnects the respective ends of the tips of opposed clips thereby forming the strut into an integral unit. The bridge sections have the same width as the tip but the overall transverse distance between them is approximately equal to the height of the joint openings thereby forming a step 25 between each tip and its associated bridge sections. The top of the bridge sections are acuate so that they tightly interfit with the arcuate top and bottom of the joint openings, and the length of the bridge sections is quite short, preferably positioning adjacent facets of joint elements interconnected by the strut less than 0.25 inches apart.

An extension section 26 extends transversely from each bridge section to allow squeezing pressure to be applied between them to allow the clips to be depressed for removal from the joint openings without the user's fingers interferring with the joint element.

In the embodiment illustrated the extension section is an upstanding U-shaped integral medial protrusion of the bridge with an enlarged head 28 at its end to facilitate gripping it. Paired tabs 30 located on the heads are configured to engage with snap type interlocking building blocks 31, such as the aforementioned "Lego" block as shown in FIG. 4.

The width of each extension section 26 is such that the portion of bridge section 24 remaining on each side of it are slightly longer than the thickness of the joint element side walls 32, FIG. 4. Therefore, when the clips of the strut are installed in adjacent joint elements the respective facets 14 thereof are closely adjacent to the sides of the extension section.

Figure 5:
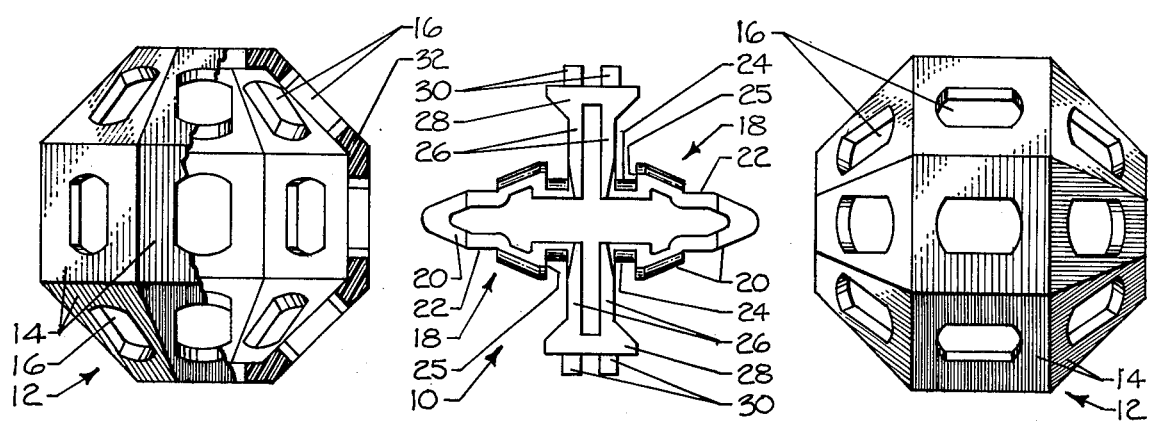
FIGS. 5, 6 and 7 are side elevational views, partially broken away, showing the sequence of installing the strut into two of the joint elements.
Figure 6:
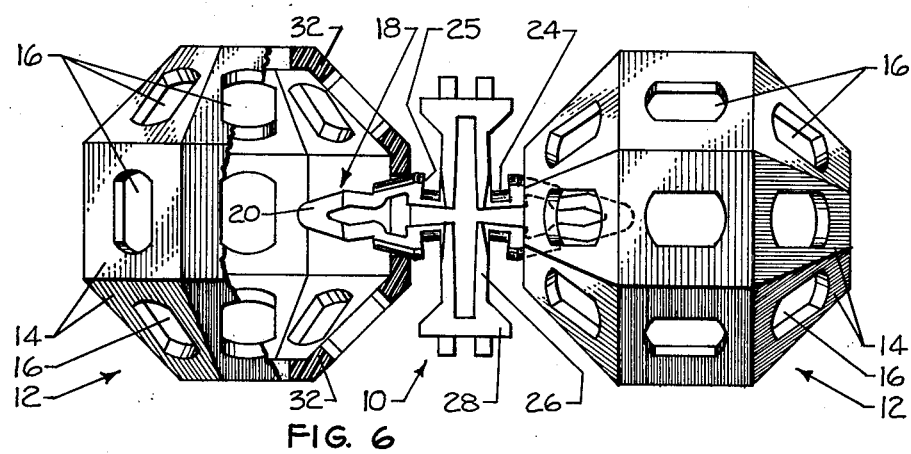

In operation clip 18 of strut 10 is inserted into a joint opening 16 of a joint element 12 by placing the apex of tip 20 into the opening, FIG. 5, and urging the strut toward the joint element. Accordingly, the clip is deflected inwardly about the apex of the tip, FIG. 6, until step 25 passes side wall 32 of the joint element, and the clip again is free to expand to its relaxed position with bridge sections 24 located adjacent to the top and bottom of the joint openings, FIG. 7. In this position the strut cannot be separated from the joint element by merely applying tensile force due to the engagement of side wall 32 by step 25. To release the clip, bridge sections 24 are squeezed together to deflect the tips 20 inwardly and thereby release step 25 from side wall 32.

When joint elements are attached to the clips at both ends of a strut, the joint elements are closely adjacent which facilitates building certain types of structures. Extensions 26, therefore, are used to squeeze the bridge sections together for removal of the strut when the user's finger cannot be inserted between the joint elements to squeeze the bridge sections directly.

It will be noted that when a clip is installed in a joint opening 16, the elongate shape of the clip and opening causes a tight fit therebetween. Therefore, the clip and joint element are prevented from rotating relative to one another.

Figure 7:
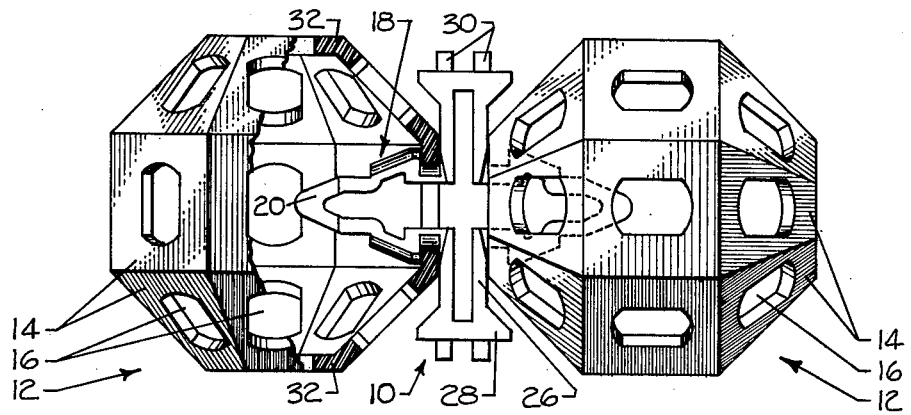
Figure 8:
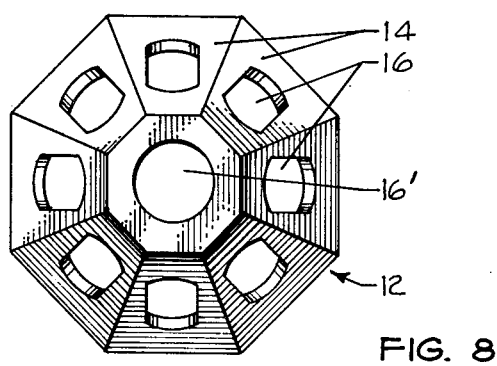
FIG. 8 is a plan view of one of the joint elements with which the strut is used.

However, if the clip is inserted into one of the circular openings 16,' FIG. 8, located in the end of the joint elements, the arcuate surfaces on bridge sections 24 serve as a bearing surface thereby allowing the strut to rotate relative to the joint element. Therefore, as shown in FIG. 7, by placing the clip at one end of a strut into one of the elongate joint openings of a first joint element, and placing the clip at the other end of the strut into one of the circular openings 16,' in the end of a second joint element, the second joint element is rotatable relative to the first joint element. Accordingly, the first joint element can be incorporated into a structure and the second joint element used for example as the hub of a wheel.

The terms and expressions which have been employed in the foregoing abstract and specifications are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a construction set having multi-faceted joint elements with a joint opening located in each facet, and elongate struts which have compressibly releasable clips at each end arranged to be engaged in said joint openings so as to interconnect adjacent ones of said joint elements, a close coupling strut comprising:
   (a) paired clips, said clips facing in opposite directions generally along a common axis;
   (b) said clips being elastically compressible for insertion into or removal from said joint openings, and having means for interlocking with said joint elements upon return to their released position when seated in said joint openings;
   (c) a bridge interconnecting said paired clips, said bridge operably associated with said clips so that application of squeezing pressure on said bridge causes both of said clips associated therewith to be depressed.

2. The strut of claim 1 wherein said bridge is arranged so that when joint elements are attached to the clips at opposite ends of said strut, the respective facets of said joint element are closely spaced so as to prevent squeezing of said bridge by a user's finger, and said strut further comprises extension means attached to said bridge on both sides thereof, said extension means arranged to extend outwardly of said facet to a position where they are contactable by the fingers of a user for squeezing said bridge.

3. The strut of claim 2 wherein said extension means includes transversely extended tabs configured to engage snap type interlocking building blocks.

4. The strut of claim 2 wherein said clips have V-shaped tips arranged to self-depress said clips upon urging of said clips into said joint openings.

5. In a construction set having multi-faceted joint elements with a joint opening located in each facet, and elongate struts which have compressibly releasable clips at each end arranged to be engaged in said joint openings so as to interconnect adjacent ones of said joint elements, a close coupling strut comprising:
   (a) paired clips, said clips facing in opposite directions generally along a common axis;
   (b) said clips having V-shaped tips, said tips having a width which is slightly less than the width of said joint opening, and said tips having ends located opposite the apex thereof, said ends having an overall transverse dimension which is slightly greater than the height of said joint openings;
   (c) paired bridge sections interconnecting the respective ends of the tips of opposed clips, said bridge sections having an overall transverse dimension there between which is approximately equal to the height of said joint opening;
   (e) an extension extending transversely from each of said bridge sections intermediate its ends; and
   (f) said clips being elastically depressable by application of squeezing pressure on said extensions for insertion into and removal from said joint openings.

6. The strut of claim 5 including a short indentation located medially in said V-shaped tip arranged for communicating within snap type interlocking building blocks.

* * * * *

UNITED STATES PATENT AND TRADEMARK OFFICE
CERTIFICATE OF CORRECTION

PATENT NO. : 4,159,592

DATED : July 3, 1979

INVENTOR(S) : Richard J. Gabriel

It is certified that error appears in the above—identified patent and that said Letters Patent are hereby corrected as shown below:

Col. 2, Line 53  Change "acuate" to --arcuate--

Col. 2, Line 64  Change "acuate" to --arcuate--

Signed and Sealed this

Twenty-third Day of October 1979

[SEAL]

Attest:

RUTH C. MASON
Attesting Officer

LUTRELLE F. PARKER
Acting Commissioner of Patents and Trademarks